United States Patent [19]

Rockney

[11] Patent Number: 5,498,461
[45] Date of Patent: Mar. 12, 1996

[54] PROTECTIVE METALLIZED LOOP LAMINATE

[75] Inventor: Douglas L. Rockney, Naperville, Ill.

[73] Assignee: Safe-T-Quip Corporation, Chicago, Ill.

[21] Appl. No.: 83,049

[22] Filed: Jun. 25, 1993

[51] Int. Cl.⁶ .................................................. B32B 3/06
[52] U.S. Cl. ................... 428/100; 24/306; 24/442; 24/451; 174/35 R; 174/35 MS; 428/95; 428/99; 428/131; 428/137; 428/192; 428/219; 428/220; 428/458; 428/472.2; 428/474.4
[58] Field of Search .................... 428/100, 99, 131, 428/137, 192, 220, 219, 458, 472.2, 474.4, 95; 174/35 R, 35 MS; 24/306, 442, 451; 2/DIG. 6; 52/DIG. VD

[56] References Cited

U.S. PATENT DOCUMENTS

| | | | |
|---|---|---|---|
| 2,992,939 | 7/1961 | Larson et al. | 117/75 |
| 3,026,367 | 3/1962 | Hartwell | 174/35 |
| 3,060,069 | 10/1962 | Sindars | 154/45 |
| 3,332,447 | 7/1967 | Holmgren | 138/125 |
| 3,413,406 | 11/1968 | Plummer | 174/3 |
| 3,455,589 | 7/1969 | Valiulis | 292/1 |
| 3,464,094 | 9/1969 | Mates | 24/204 |
| 3,467,761 | 9/1969 | Plummer | 174/36 |
| 3,695,987 | 10/1972 | Wisotzky | 428/95 |
| 3,728,204 | 4/1973 | Cochran | 428/95 |
| 3,941,159 | 3/1976 | Toll | 138/147 |
| 3,947,927 | 4/1976 | Rosenthal | 24/81 SK |
| 4,091,766 | 5/1978 | Colliard | 119/106 |
| 4,273,130 | 6/1981 | Simpson | 128/327 |
| 4,375,009 | 2/1983 | Fearnside et al. | 174/36 |
| 4,389,587 | 6/1983 | Levine et al. | 310/208 |
| 4,400,420 | 8/1983 | Bakken et al. | 428/99 |
| 4,409,427 | 10/1983 | Plummer, III | 174/36 |
| 4,413,656 | 11/1983 | Pithouse | 138/110 |
| 4,426,816 | 1/1984 | Dean et al. | 52/202 |
| 4,457,068 | 7/1984 | Maler, Jr. | 29/825 |
| 4,572,922 | 2/1986 | Plummer, III | 174/36 |
| 4,595,615 | 6/1986 | Cohen | 428/36 |
| 4,684,762 | 8/1987 | Gladfelter | 174/36 |
| 4,706,914 | 11/1987 | Ground | 248/74.3 |
| 4,717,611 | 1/1988 | Petrella | 428/100 |
| 4,734,542 | 3/1988 | Klein | 174/36 |
| 4,759,812 | 7/1988 | Miller | 156/98 |
| 4,780,347 | 10/1988 | Cohen | 428/36 |
| 4,791,236 | 12/1988 | Klein et al. | 174/36 |
| 4,802,509 | 2/1989 | Brandolf | 138/110 |
| 4,803,104 | 2/1989 | Peigneur et al. | 428/35.1 |
| 4,822,659 | 4/1989 | Anderson et al. | 428/99 |
| 4,825,879 | 5/1989 | Tan | 128/633 |
| 4,870,725 | 10/1989 | Dubowik | 24/442 |
| 4,930,543 | 6/1990 | Zuiches | 138/110 |
| 5,055,334 | 10/1991 | Lechuga | 428/99 |
| 5,136,119 | 8/1992 | Leyland | 174/35 R |

FOREIGN PATENT DOCUMENTS

| | | | |
|---|---|---|---|
| 1211774 | 3/1966 | Germany | 24/442 |
| 4336001 | 11/1992 | Japan | 24/442 |

OTHER PUBLICATIONS aplix ® Loop #108 Self–gripping fasteners.
aplix ® Hook & Loop #800 Self–gripping fasteners.
aplix ® Hook #922 Self–gripping fasteners.
aplix ® Self–gripping fasteners Technical Brochure.

*Primary Examiner*—Nasser Ahmad
*Attorney, Agent, or Firm*—Lockwood, Alex, Fitzgibbon & Cummings

[57] ABSTRACT

A laminate is provided that includes a sheet of loop material laminated to a sheet of metallized flexible material. The laminated sheets are coextensive in size and are permanently joined together so that one does not slide with respect to the other. A strip of hook material can also be provided for securement purposes whereby the laminate is secured to itself along an edge portion or whereby the loop surface of the laminate is secured to a portion of a device to be protected.

22 Claims, 3 Drawing Sheets

PROTECTIVE METALLIZED LOOP LAMINATE

BACKGROUND AND DESCRIPTION OF THE INVENTION

This invention generally relates to laminated sheeting having insulative and reflective properties. More particularly, the invention relates to a protective laminate including a metallized sheeting layer and a layer of loop material sheeting. In a specific embodiment of the invention, one or more strips of sheeting having a surface of hook profile members is also associated with the laminate sheet in order to provide an easy engagement and disengagement capability which is characteristic of hook and loop combinations.

In the past, various approaches have been taken in order to provide protective coverings such as for conduits, cables, electrical equipment and other devices needing shielding from either the elements or other equipment. Shielding can also be necessary to prevent undesirable transmission beyond the device being protected. Exemplary patents in this regard include U.S. Pat. Nos. 3,026,367, 3,413,406, 4,400,420, 4,409,427, 4,595,615 and 4,791,236.

Some of the approaches exemplified by these patents incorporate materials which exhibit insulating properties so as to afford protection during, for example, cold weather or warm weather. Others of the approaches exemplified by these prior patents incorporate conductive braiding or coatings impregnated into fabric or sheeting. Some are designed for increasing conductivity, while others are designed for shielding purposes. It is also known to incorporate hook and loop components to provide a means for attaching protective or insulating sheeting components around or onto devices which are the object of the protecting or insulating activity.

In accordance with the present invention, it has been determined that important advantages can be obtained when metallized flexible sheeting material is laminated directly with and onto polymeric flexible sheeting shaped into a polymeric support having loop profiles thereon, which loop profiles are thereby substantially coextensive with the flexible metallized layer in back-to-back relationship with one another. In this manner, the flexible laminate has two totally distinct surfaces. One of them, which will function as an outside surface when in use, presents a substantially smooth and reflective metallized layer, whereas the other side of the laminate, which is the interior side when in use, provides a layer that has exceptional insulative properties as well as the ability to be readily fastened and unfastened from a suitable hook component when desired. In one embodiment of the invention, hook component stripping is secured, such as by an adhesive or the like, onto a unit to be protected or a casing or other component in the vicinity of the unit to be protected. In another embodiment, a strip of hook material is secured in a permanent fashion such as by sewing or the like, directly onto an edge of the laminate so as to extend therebeyond. In this latter arrangement, the hook profiles of the sheet of hook material have a presentation face which is oriented in a direction opposite of the presentation face provided by the loop profiles of the laminate.

It is accordingly a general object of the present invention to provide an improved protective metallized loop laminate.

Another object of the present invention is to provide an improved protective material which exhibits a smooth, reflective surface as well as an opposite surface having spaced profile components which provide air circulation benefits.

Another object of this invention is to provide an improved protective metallized loop laminate which is readily secured to and, when desired, separated from a strip of hook profiles.

Another object of the present invention is to provide an inexpensive and easy to use and shape laminate that provides a protective barrier for undesirable transmissions such as transmission of heat, radio frequencies, and the like.

These and other objects, advantages and features of the present invention will be apparent from and clearly understood through a consideration of the following detailed description.

BRIEF DESCRIPTION OF THE DRAWINGS

In the course of this description, reference will be made to the attached drawings, wherein.

DETAILED DESCRIPTION OF THE INVENTION

Figure 1:
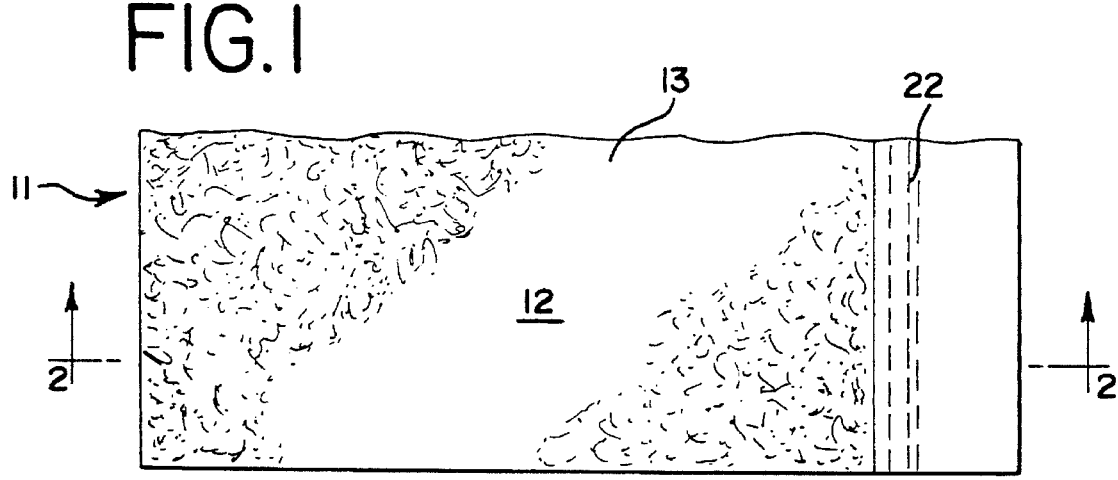
FIG. 1 is a top plan view, partially cut away, of one embodiment of the protective metallized loop laminate.

A laminate in accordance with the present invention, generally designated as 11, is illustrated in FIG. 1. Included is a flexible sheet of loop material 12 having a large number of polymeric loops 13 secured to and projecting from a flexible polymeric base sheet 14. It will be noted that air spaces 15 are present between the various generally upstanding loops 13.

Metallized layer 16 is laminated to the polymeric base sheet 14 of the loop material sheet 12. Lamination is accomplished by suitable commercial equipment which applies pressure to the materials being laminated, such as by passing the sheets between opposing pinch rollers, in order to thereby secure the loop material sheeting 12 to the metallized layer sheeting 16.

In a preferred form of the invention, a generally pliable or conforming intermediate layer 17 is positioned between the loop material sheeting 12 and the metallized layer sheeting 16 prior to lamination. For example, layer 17 can be coated onto the back side or inside surface of the polymeric base sheet 14 by spraying, coating or the like.

It has been found that this intermediate layer provides important compliant properties during the lamination procedure. These compliant properties accommodate the uneven profile which may be presented by the loop material through the flexible base 14. When this uneven profile is transmitted to the metallized layer sheeting 16, this metallized sheeting is imbued with a rough texture or grain, rather than a smooth and flat and highly reflective surface which can be a valuable attribute in applications where reflectivity is of paramount importance. Polyurethane materials or other especially compliant, stretchable/or elastomeric polymers have been found to suitably perform this function of the intermediate layer 17 to provide a laminate having an especially flat reflective surface that is free of any substantial undulations.

Typically, the lamination can be secured together with the assistance of an adhesive that is applied to the inside surface of either the metallized layer 16 or the polymeric base sheet 14, with, without, or as a substitute for the conforming intermediate layer 17 thereon. A suitable adhesive is a high temperature modified thermoplastic adhesive that can withstand a surface temperature of about 400° to 450° F. and a short-term exposure of 500° F., such as acrylic pressure sensitive adhesives which are formulated for high temperature applications.

Figure 2:
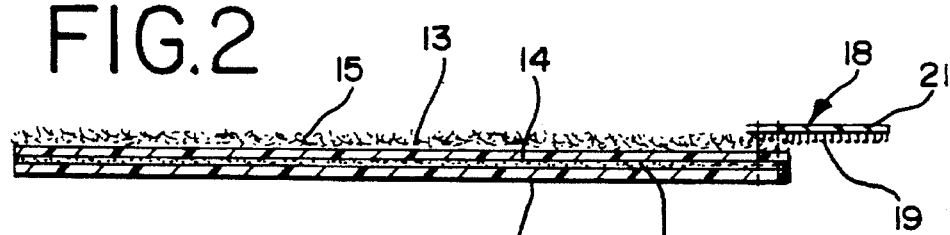
FIG. 2 is a cross-sectional view along the line 2—2 of FIG. 1.

One or more hook material strips 18 can be utilized in association with the protective metallized loop laminate. Strip 18 includes a plurality of hook members 19 projecting from a backing strip 21. Hook members can be monofilaments and can take on any suitable shape, such as J-shapes, mushroom profiles, arrowhead configurations and the like. Laminate 11 and hook strip 18 can be secured together such as by sewing 22, adhesives, heat welding or sealing and the like. When thus secured, it is preferred that the strip 18 be oriented as illustrated in FIG. 2, namely that the hook members 19 be facing the direction opposite to the direction faced by the loop members 13. With this assembly arrangement, the laminate can, for example, be wrapped around a conduit, with the metallized surface on the outside and the loop material on the inside, contacting the conduit. With this orientation, the hook members 19 are positioned for presentation facing a portion of the loop material of the wrapped laminate, thereby securing one to the other. In this regard, the hook members 19 thus engage the portion of the loop material which lines up with the hook members after the laminate is wrapped over or around the conduit or the like, thereby providing an automatic adjustability feature to the protective covering.

Figure 3:
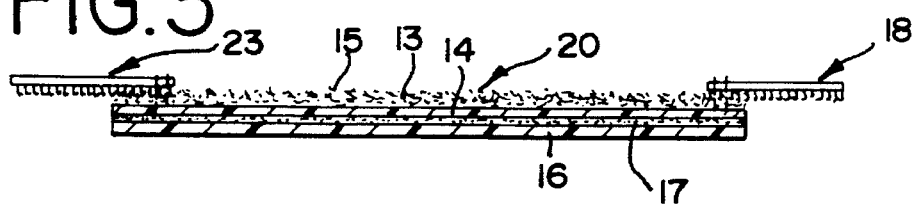
FIG. 3 is a cross-sectional view on the order of FIG. 2, but illustrating a revised version of this embodiment.

In the embodiment illustrated in FIG. 3, hook material strips are positioned on generally opposing edges of a laminate 20. In addition to hook material strip 18, another generally opposing hook material strip 23 is also secured such as by sewing or the like onto another edge of the laminate 20 in order to provide additional variability in attachment options.

Loop profiles, hook profiles and their respective backings are made of flexible and tough, nonconductive and insulative materials including a nylon or other polyamide material such as Nomex, and other materials including polypropylene, polyesters, and combination polymeric materials as well as stainless steel fibers on Nomex backing or tape. Exemplary loop sheets can be a woven nylon base with nylon napped loops. Hooks can be nylon monofilaments. Foil sheeting for the laminate can be made of materials such as aluminum foil, aluminized polyethylene terephthalate or Mylar polymer, stainless steel foil, copper foil and the like. A preferred foil sheeting is so called dead soft aluminum at a thickness of about 1 mil.

The embodiment illustrated in FIGS. 4, 5, 5A and 6 is representative of the use of the laminate in accordance with the invention as a shielding cover for equipment needing protection from environmental influences or otherwise needing a barrier between it and its environment. In this illustration, laminate, generally designated as 31, covers a portion of an electronic device 30. The principal construction of this laminate 31 is that of laminate 11. Loop material sheeting 32 is laminated or adhered to metallized layered sheeting 36. Loop material sheeting 32 includes a multitude of loops 33 projecting from a polymeric base sheet 34, with air spaces 35 between the loops 33.

Figure 5:
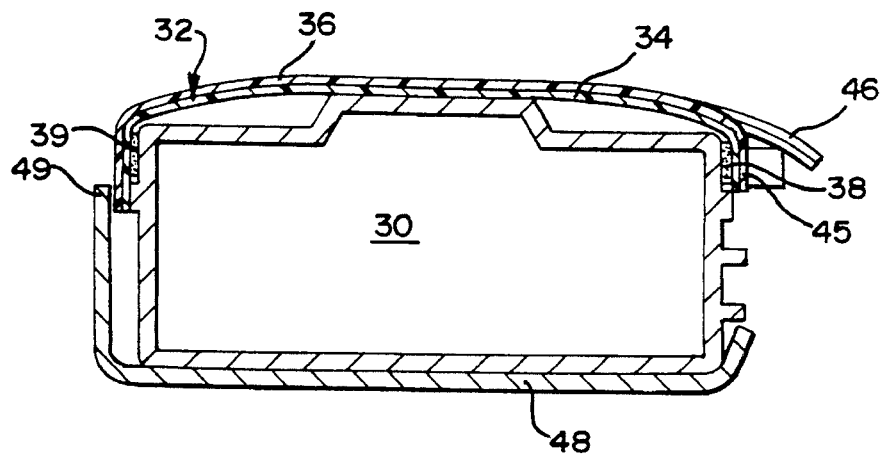
FIG. 5 is a cross-sectional view along the line 5—5 of FIG. 4.
Figure 5A:
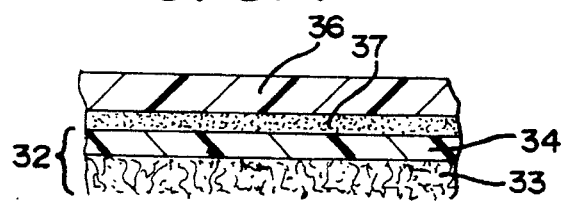
FIG. 5A is an enlarged detail view of the protective metallized loop laminate as deployed in FIG. 5.

As can be seen in FIG. 5A, laminate 31 preferably includes a conforming polymeric intermediate layer 37 positioned between the polymeric base sheet 34 and the metallized base sheet 36 in order to impart an especially smooth and flat texture to the external, reflective surface of the metallized base sheet 36. Accordingly, the laminate presents a particularly reflective outer surface and an inner surface that facilitates air flow between the laminate 31 and the component which it contacts, while at the same time presenting an interior surface that readily engages with and detaches from hook material when desired.

Figure 6:
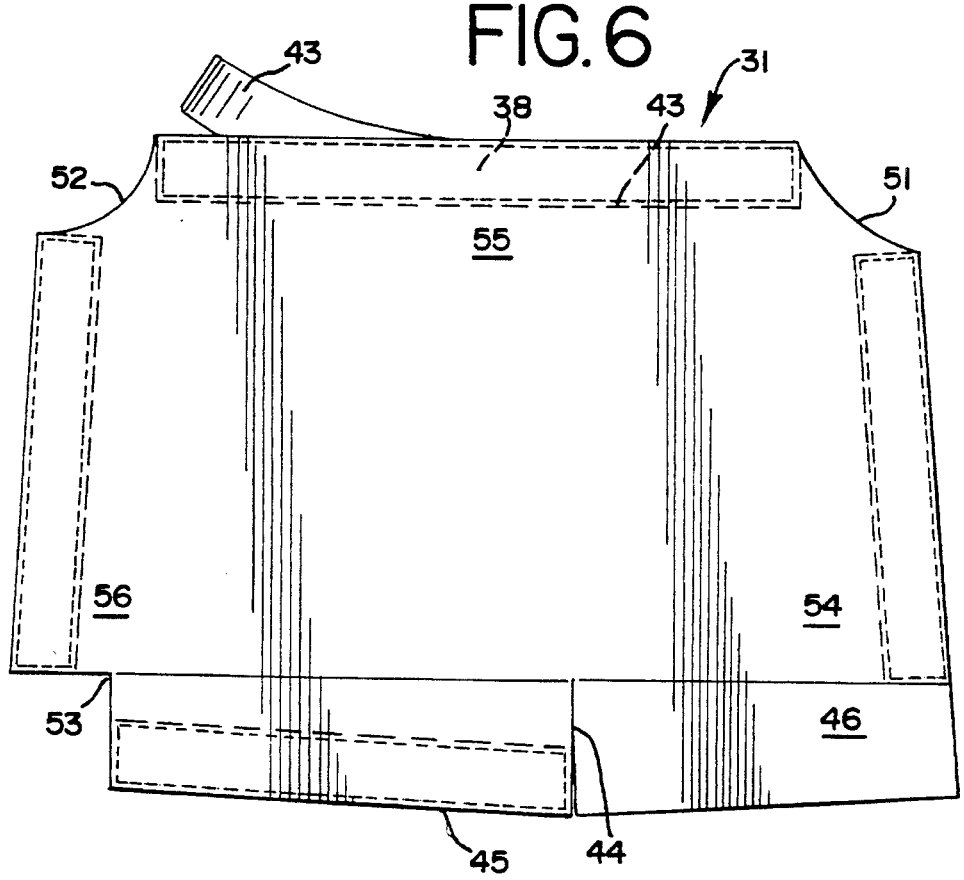
FIG. 6 is a plan view of the laminate in accordance with the embodiment of FIGS. 4 and 5.

In this illustrated embodiment, hook material strips 38 are secured to the device 30 to be protected, as generally illustrated in FIG. 5. As illustrated in FIG. 6, hook material strip(s) 38, 39 can be presented together with the laminate 31 by having the hooks of each strip 38, 39 engaged with the loops of the laminate 31 prior to assembly onto the device 30. When assembly is intended, a protective cover strip 43 is removed to expose suitable attachment means, such as a pressure sensitive adhesive, on the back surface of each hook material strip 38, 39. Then, each hook material strip is secured to the appropriate location on the device 30. Once secured at these locations, such as the locations of the strips 38, 39 shown in FIG. 5, it will be possible to attach and detach the laminate 31 by engaging the hooks of the hook material strips to, and disengaging them from, the loops of the laminate 31.

Figure 4:
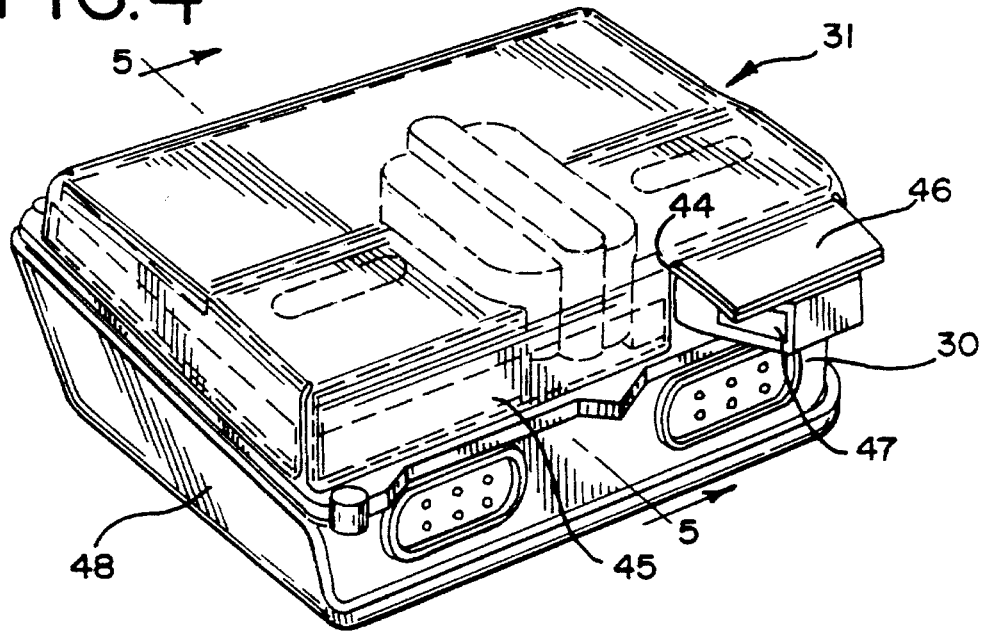
FIG. 4 is a perspective view illustrating the use of another embodiment of the protective metallized loop laminate in accordance with invention.

Laminate 31 can also include shape-conforming components, such as those utilizing a slit 44 as illustrated. Such a slit 44 or the like allows for a portion of the laminate to take on a shape when secured to the electronic module or like device 30 which accommodates projecting or inset surfaces of the device 30. For example, as illustrated in FIGS. 4 and 5, slit 44 helps to define a folded flap 45 and a projecting flat 46. Folded flap 45 engages a hook material strip 38 secured to a wall of the device 30, while projecting flap 46 remains substantially unfolded when the laminate 31 is fully secured to the device 30 in order to generally cover a projecting housing 47. Laminate 31 also typically includes corner openings 51, 52, 53 for facilitating folding over of edge portions 54, 55, 56 around edges of the device 30.

With further reference to the embodiment illustrated in FIGS. 4, 5, 5A and 6, the device 30 can take the form of a programmed control module which is located within the engine compartment of an automobile or other vehicle. The module is positioned within a generally rigid mounting base 48 that is primarily responsible for holding the module in place under the hood of a vehicle. In prior art arrangements, a mounting cover (not shown), made of the same rigid material as the mounting base 48, would provide a protective cover which engages the mounting base 48 to substantially enclose the module. This aspect of the present invention totally eliminates such a rigid cover. In some applications, the mounting base 48 may have an upstanding lip portion 49 which directly engages an edge portion of the laminate 31. In those instances where this engagement is present, and provided this engagement affords adequate holding forces, hook material strip 39 can be omitted. In some applications, adequate holding can be provided by this type of pinching engagement between the mounting base 48 and the laminate 31 at more than the single location illustrated in FIG. 5, in which instance all hook material strips can be completely eliminated.

Figure 7:
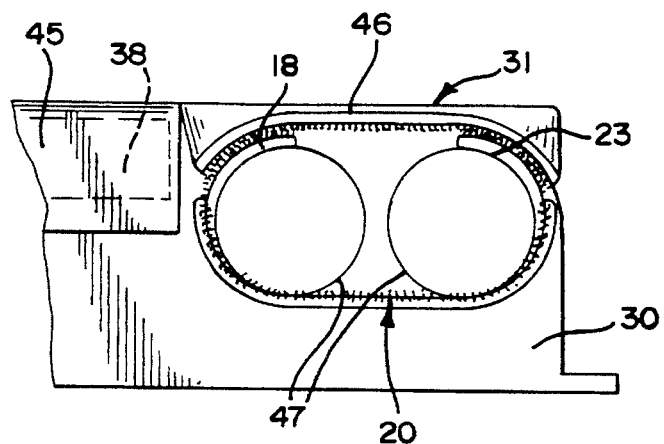
FIG. 7 is a front elevational view of a further embodiment of a use along the lines of that shown in FIG. 4.

In a further illustrated embodiment, a component such as that shown in FIG. 3 is combined with the laminate 31. This embodiment is illustrated in FIG. 7, wherein the FIG. 3 laminate 20 is joined to the projecting flap 46 of the laminate 31 in order to provide added reflective covering around projecting housings 47 of the electronic component 30. More specifically, hook material strip 23 is secured to an edge of the projecting flap 46. The laminate 20 is then securely wrapped around a portion of the housing or housings 47, with the other hook material strip 18 being secured to an opposing edge of the projecting flap 46.

Figure 8:
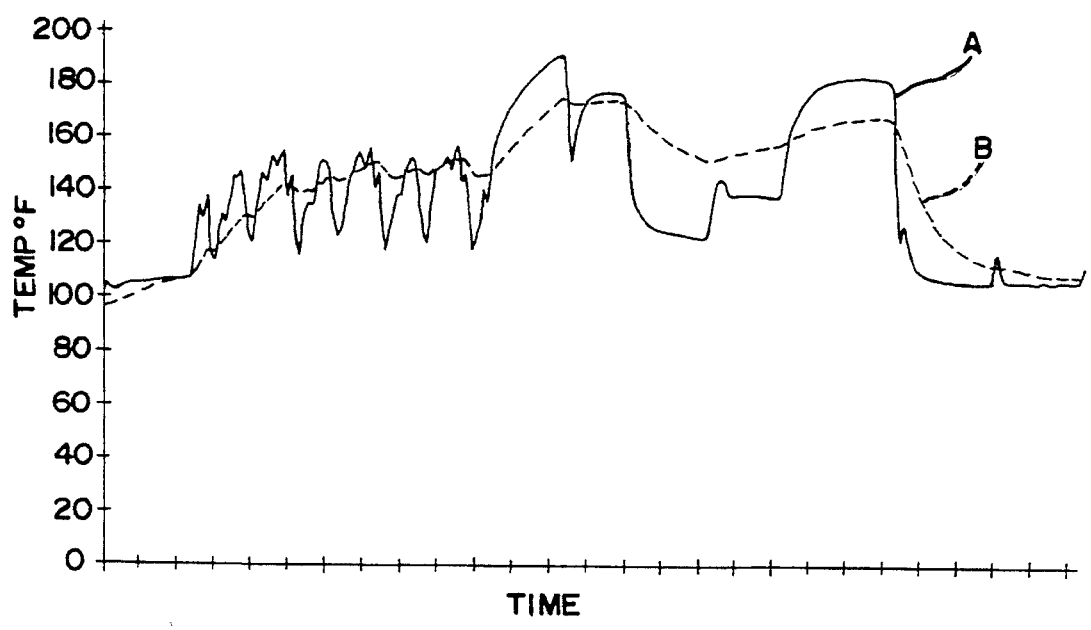
FIG. 8 is a plot of comparative data illustrating enhanced protection against heat transfer accomplished by the present invention.

FIG. 8 provides a comparison of the effectiveness of the prior art rigid mounting cover arrangement for a programmed control module as discussed hereinabove when compared with the use of the laminate 31 as a replacement for the rigid cover. FIG. 8 plots the temperature on the top surface of the programmed control module during wind tunnel testing designed to simulate city driving conditions. The solid line "A" in FIG. 8 plots the temperature cycling that was experienced when the rigid covering over the mounting base 48 was used, while the broken line "B" represents the temperature variation over time when the laminate in accordance with the present invention was utilized as the cover over mounting base 48 as shown generally in FIG. 5. It will be noted that the present invention virtually eliminated the temperature cycling of the prior art cover wherein the temperature continuously rises and falls during relatively short time swings under somewhat harsh driving conditions, which is believed to be detrimental to components such as programmed control modules, thereby reducing their total operating lives. Such improved effectiveness is believed to be due to the combination of the additional air space directly above the cover of the module which is provided by the loop material of the laminate, together with the reflectivity provided by the metallized exterior surface of the laminate. In addition, a radiofrequency barrier between the programmed control module and the other components in the engine compartment is provided by the laminate in accordance with present invention.

It will be understood that the embodiments of the present invention which have been described are illustrative of some of the applications of the principles of the present invention. Numerous modifications may be made by those skilled in the art without departing from the true spirit and scope of the invention.

I claim:

1. A removable and flexible protective laminate wrapping, comprising:

a strip of hook material having a plurality of spaced hooks;

a flexible sheet of loop material having one surface including a plurality of spaced loops and an opposite flexible polymeric surface, said flexible sheet of loop material being bendable and generally conformable, said plurality of spaced loops being sized and shaped for mating and securing engagement with said plurality of spaced hooks, said mating and securing engagement being such that said loops and said hooks are manually disengageable from each other, said spaced hooks of the strip are attached to the loops along two generally opposite edges of said sheet of loop material;

a sheet of metallized flexible foil sheeting;

said sheet of metallized flexible foil sheeting being laminated with and directly onto substantially the entirety of the opposite flexible polymeric surface of said flexible sheet of loop material such that the loop material is coextensive with the metallized flexible foil sheeting, the loop material and the metallized flexible foil sheeting facing in opposing directions away from one another to form a protective laminate wrapping having an engagement surface of the loop material and an outside reflective surface of the metallized foil sheeting; and the protective laminate wrapping is flexible and pliable and has a wrapped condition at which it generally conforms to a desired shape, said engagement surface of the loop material removably secures the protective laminate wrapping in cooperation with said strip of hook material, and said outside reflective surface of the metallized foil sheeting provides a heat reflective barrier that is manually removable from and manually re-securable to its said wrapped condition.

2. The laminate in accordance with claim 1, wherein said strip of hook material is secured to an edge portion of the laminate such that the hooks face in a direction opposite of the loops of the loop material and said strip of hook material is generally coplanar with the metallized material flexible foil sheeting.

3. The laminate in accordance with claim 2, including another strip of hook material secured to a generally opposite edge portion of the laminate such that the hook material faces in a direction opposite to the loops and is generally coplanar with the metallized toil sheeting.

4. The laminate in accordance with claim 1, wherein said strip of hook material is secured to a component onto which the laminate is removably fastened.

5. The laminate in accordance with claim 4, wherein the strip of hook material is secured to a programmed control module within the engine compartment of a vehicle.

6. The laminate in accordance with claim 1, wherein the plurality of loops generally define air space therewithin and therebetween which facilitates air circulation and heat dissipation, and wherein the sheet of metallized flexible material provides reflective shielding.

7. The laminate in accordance with claim 1, wherein said sheet of loop material and said sheet of metallized flexible foil sheeting cover the same area.

8. The laminate in accordance with claim 1, wherein said sheet of metallized flexible foil sheeting has a surface which is smooth and more reflective than metallized flexible materials having a less flat and rough texture.

9. A protective laminate wrapping, comprising:

a strip of hook material having a plurality of spaced hooks;

a sheet of loop material including a plurality of loops, said sheet of loop material being flexible so as to be bendable and generally conformable, said plurality of spaced loops being sized and shaped for mating and securing engagement with said plurality of spaced hooks, said mating and securing engagement being such that said loops and said hooks are manually disengageable from each other, said space hooks of the strip are attached to the loops along two generally opposite edges of said sheet of loop material;

a sheet of metallized flexible foil sheeting laminated to substantially the entirety of the sheet of loop material such that the loop material is coextensive with the metallized flexible foil sheeting, the loop material and the metallized flexible foil sheeting facing in opposing directions away from one another;

a pliable polymeric intermediate layer positioned between the sheet of loop material and the sheet of metallized flexible foil sheeting to form a protective laminate wrapping, which pliable intermediate layer generally conforms to the shape of the loops to substantially prevent the foil sheeting from conforming to the shape of the loops so as to provide the sheet of metallized flexible foil sheeting with a smooth and planar surface; and the protective laminate wrapping is flexible and pliable so as to generally conform to the shape of and wrap over least a portion of a component to be protected, loops of the sheet of loop material provide a flexible engagement surface to engage the component, and the metallized flexible foil sheeting provides an outside smooth reflective surface.

10. The laminate in accordance with claim 9, wherein the intermediate layer is a polyurethane material.

11. The laminate in accordance with claim 1, wherein the sheet of loop material and the sheet of metallized flexible foil sheeting are laminated together through the use of an adhesive between said sheets.

12. The laminate in accordance with claim 1, wherein said sheet of loop material is a polyamide material and said sheet of metallized flexible foil sheeting is aluminum foil having a thickness of approximately 1 mil.

13. A protective laminate wrapping, comprising:

a strip of hook material having a plurality of spaced hooks;

a flexible sheet of loop material including a plurality of loops, said flexible sheet including a pliable polymeric intermediate material, said loop material having air spaces between and within the plurality of loops, which loops provide an engagement surface that is bendable and generally conformable, said plurality of spaced loops being sized and shaped for mating and securing engagement with said plurality of spaced hooks, said mating and securing engagement being such that said loops and said hooks are manually disengageable from each other, said spaced hooks of the strip are attached to the loops along two generally opposite edges of said sheet of loop material;

a flexible sheet of metallized foil sheeting laminated to substantially the entirety of said pliable polymeric intermediate material such that the plurality of loops are coextensive with the sheet of metallized flexible foil sheeting, the loops and the metallized flexible foil sheeting facing in directions away from one another and on opposite sides of the pliable polymeric intermediate material; said pliable polymeric intermediate material generally conforming to the shape of the loops to substantially prevent the foil sheeting from conforming to the shape of the loops so as to provide the flexible sheet of metallized foil sheeting with a smooth and planar surface; and an adhesive between said sheet of loop material and said flexible sheet of metallized foil sheeting, which adhesive cooperates in laminating the flexible sheet of loop material to the flexible sheet of metallized foil sheeting.

14. The loop laminate in accordance with claim 13, wherein said strip of hook material is secured to an edge portion of the laminate such that the hooks face in a direction opposite of the loops of the loop material and said strip of hook material is generally coplanar with the metallized flexible foil sheeting.

15. A protective laminate blank, comprising:

a flexible sheet of loop material having a plurality of loops and a pliable polymeric intermediate sheet material laminated to a sheet of metallized flexible foil sheeting to provide a metallized loop laminate having oppositely directly faces, one of which includes said plurality of loops and the other of which is an outside surface of said metallized flexible foil sheeting, said loop material metallized flexible foil sheeting being coextensive, said pliable polymeric intermediate material generally conforming to the loops to prevent the foil sheeting from conforming to the loops and to provide the sheet of metallized flexible foil sheeting with a smooth and planar surface, said laminate being in the form of a blank including:

a body portion composed of said metallized loop laminate;

a plurality of edge portions of said laminate extending outwardly in generally opposite directions from said body portion, said edge portions having a corner opening therebetween for accommodating folding of the edge portions with respect to the body portion; and a flap portion extending away from the body portion and foldable with respect to the body portion, said flap portion having a slit to define separate sections of the flap portion foldable independently of each other, said blank further including a strip of hook material having a plurality of spaced hooks, wherein said spaced hooks of the strip are attached to the loops of two generally opposite edges of said flap portion.

16. The loop laminate blank in accordance with claim 15, wherein the body portion has four sides, three edge portions are provided on three respective said sides of the body portion, and the flap portion is on the fourth said side.

17. The loop laminate blank in accordance with claim 15, further including a hook material strip, said hook material strip having a base and a plurality of hooks secured thereto, said hooks being engaged with loops on at least one of the edge portions, and the base of the hook material strip is attachable to a device for protecting the device from environmental influences.

18. The loop laminate blank in accordance with claim 15, further including a laminate strip having hooks attached to the loops of two generally opposite edges of said flap portion, said-laminate strip being a flexible sheet of loop material having a plurality of loops laminated to a flexible sheet of metallized material, whereby the metallized material of the laminate strip and the metallized foil sheeting of the protective laminate blank provide a generally continuous metallized material surface.

19. The laminate in accordance with claim 1, wherein said metallized flexible foil sheeting has a thickness of approximately 1 mil.

20. The laminate in accordance with claim 9, wherein said metallized flexible foil sheeting has a thickness of approximately 1 mil.

21. The laminate in accordance with claim 13, wherein said metallized flexible foil sheeting has a thickness of approximately 1 mil.

22. The laminate in accordance with claim 15, wherein said metallized flexible foil sheeting has a thickness of approximately 1 mil.

\* \* \* \* \*

UNITED STATES PATENT AND TRADEMARK OFFICE
CERTIFICATE OF CORRECTION

PATENT NO. : 5,498,461
DATED : March 12, 1996
INVENTOR(S) : Douglas L. Rockney

It is certified that error appears in the above-indentified patent and that said Letters Patent is hereby corrected as shown below:

Col. 4, line 33, "Shown" should read --shown--; line 43, "projecting flat" should read --projecting flap--.
Col. 6, line 32, replace "toil" with --foil--; line 62, replace "space" with --spaced--.
Col. 7, lines 14-15, "over least" should read --over at least--.
Col. 8, lines 10-11, "material metallized" should read --material and metallized--; line 48, "said-laminate" should read --said laminate--.

Signed and Sealed this

Seventeenth Day of September, 1996

*Attest:*

BRUCE LEHMAN

*Attesting Officer*      Commissioner of Patents and Trademarks